Figure 1:
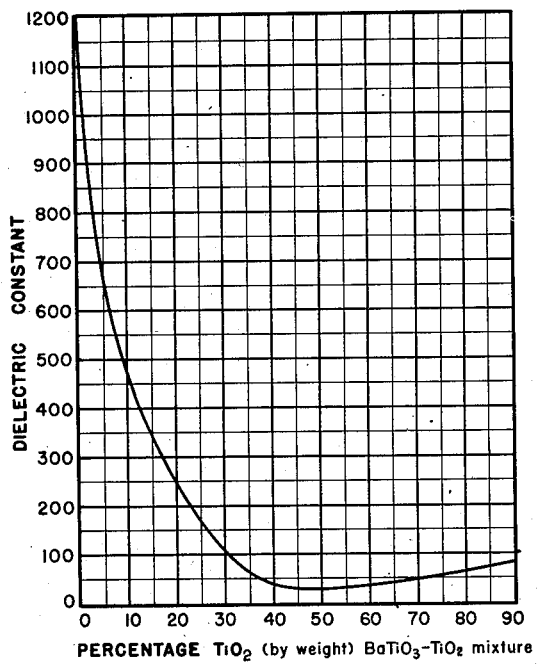
Figure 2:
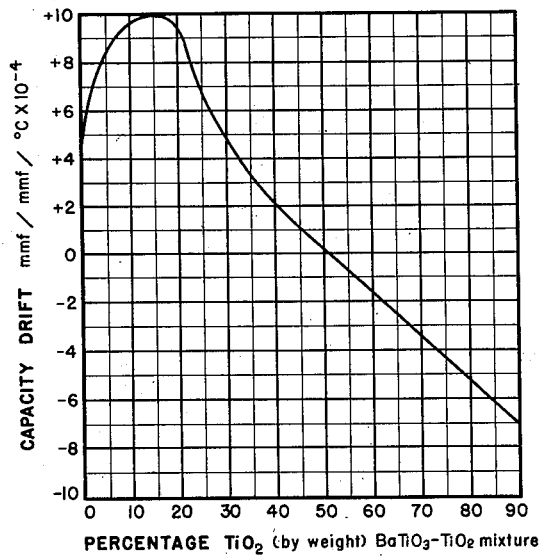

Inventors:
Hans Thurnauer
James Deaderick
By Ernest J. Mechlin
their Attorney

Patented Jan. 20, 1953

2,626,220

UNITED STATES PATENT OFFICE 2,626,220

INSULATING MATERIALS

Hans Thurnauer, Chattanooga, and James Deaderick, Signal Mountain, Tenn.

Application May 20, 1947, Serial No. 749,330

5 Claims. (Cl. 106—39)

This invention relates to ceramic insulating materials having high dielectric constants and desirable coefficients of capacity, and is a continuation-in-part of our application, Serial No. 413,340, filed October 2, 1941, and issued as Patent No. 2,429,588 of October 21, 1947.

Ceramic materials containing titanium dioxide as one of their chief ingredients are known to have unusually high dielectric constants. Whereas other ceramic materials, such as porcelain, steatite, lava, glasses, etc., have dielectric constants between 5 and 8, ceramic materials containing a high percentage of titanium dioxide have dielectric constants between 10 and 112. There are in commercial use ceramic materials to be used as dielectrics in electric condensers which not only have high dielectric constants but also have defined temperature coefficients of capacity. Such condensers are used as balancing or compensating units in oscillating circuits to compensate for capacitance and inductance changes due to temperature variations of climate or heating of the oscillating circuit during operation. Such condensers have dielectric constants between 6 and 110 and temperature coefficients of capacity between plus $1.2 \times 10^{-4}$ mmf./mmf./°C. to minus $7.5 \times 10^{-4}$ mmf./mmf./°C., mmf. as here used meaning micro-micro-farad.

The positive temperature coefficient of capacity usually is connected with the lower dielectric constant (e. g. 6) and the highest negative temperature coefficient of capacity with the highest dielectric constant (e. g. 110). A material with zero temperature coefficient of capacity usually has a dielectric constant between 17 and 19.

It is, of course, highly desirable to employ as dielectrics in condensers materials having the highest possible dielectric constants in order to obtain condenser units of minimum physical dimensions and dielectric capacities as high as possible.

We have now been able to prepare ceramic electric insulating materials, etc., which have exceptionally high dielectric constants and temperature coefficients of capacity within well defined limits.

Our invention is based on the discovery of the unusual and unexpected electric insulating characteristics of barium titanate, and of barium titanate when admixed with varying proportions of titanium dioxide. Depending upon the final properties, as to dielectric constant and temperature coefficient of capacity desired, the proportion of barium titanate and titanium dioxide can be varied between 100 parts of barium titanate and 0 part of titanium dioxide and 10 parts of barium titanate and 90 parts of titanium dioxide, with a constant amount of additional fluxes, as is customary in this art, added to each mixture. In the practice of our invention we can use pure barium titanate, $BaTiO_3$, or we can use commercial barium titanate which has a typical analysis as follows: $TiO_2$ 34.3%, $BaO$ 63.9%, $Fe_2O_3$ .03%, other oxides 1.77%.

We shall now describe ways by which our invention can be practiced.

Finely divided barium titanate, finely divided titanium dioxide and finely divided fluxes are carefully mixed, either dry or wet, to form a homogeneous mixture. We prefer the mixture to be of such fineness as to pass a 325 mesh sieve, but this is a matter of choice. If the mixture has been prepared wet, it is carefully dried, then organic binders, such as wheat flour, dextrine, etc., are added, as usual in this art, to facilitate subsequent forming. The prepared ceramic "body" is then shaped according to well-known ceramic methods, such as compression pressing, extrusion, etc. In cases where a certain amount of plasticity is desired to form complicated shapes, moisture may be added to the powder to improve its plastic properties.

After forming, the shaped pieces are fired in ceramic kilns in oxidizing or inert atmosphere to prevent the formation of any lower oxide forms of titanium, other than $TiO_2$. The firing temperature has to be such that the pieces are fired to full vitrification so that their moisture absorption is less than 0.1%. The temperature of firing has been found to be ordinarily between 1200° C. and 1400° C. For the maintenance of an inert atmosphere, we prefer the use of electrically fired kilns, but do not exclude kilns fired with other kinds of fuel.

The vitrified ceramic materials manufactured by the above-mentioned method are mechanically strong, have high dielectric strength, low dielectric loss factor at high frequency and are especially suitable as dielectric media in condensers or capacitors. Any of the ceramic materials in the series barium titanate-titanium dioxide may be useful as a dielectric in a ceramic condenser, depending on the temperature coefficient of capacity or the dielectric constant of the assembled unit desired, but of special interest is the following composition:

| | Per cent |
|---|---|
| Barium titanate | 98 |
| Tribasic calcium phosphate (as a flux) | 2 |

This composition has been found to have the extremely high dielectric constant of 1200 (approximately twelve times higher than titanium dioxide), a temperature coefficient of capacity between 40° C. and 80° C. of plus $12 \times 10^{-4}$ mmf./mmf./°C., and a power factor of 1.0%.

In the above example any of the common fluxes can be used in place of the calcium phosphate, and we make no claim to the use of such fluxes generally. In the preparation of ceramic insulating materials it is customary to mix the insulating material with a suitable flux before the material is fired. Likewise, the use of organic binders before firing is conventional.

We have prepared a whole series of barium titanate-titanium dioxide dielectrics, varying in proportions from 100% $BaTiO_3$ to 10% of $BaTiO_3$ and 90% of $TiO_2$. So that those skilled in the art may be appraised of the electric characteristics of such mixtures, we have shown, on the appended single sheet of drawings, two graphs covering the system $BaTiO_3$—$TiO_2$. Figure I shows the variation in dielectric constant, and Figure II shows the variation in capacity drift.

We are aware that magnesium titanate has been used as a dielectric material, as in the patent to Alberts-Schonberg 2,165,819, and make no claim thereto. Magnesium titanate has a dielectric constant of 15 to 18 whereas barium titanate has a dielectric constant of about 1200. Other important differences exist between the two substances, but the high dielectric constant of barium titanate is outstanding.

Having described our invention, we claim:

1. A ceramic insulator comprising a vitrified body formed from a mixture having a dielectric composition of 55 to 100% barium titanate and up to 45% titanium dioxide.

2. A ceramic insulator comprising a vitrified body formed from a mixture having a dielectric composition of 68 to 100% barium titanate and up to 32% titanium dioxide, said material having a dielectric constant between 100 and 1200.

3. A ceramic insulator comprising a vitrified body having a dielectric consisting of barium titanate and a dielectric constant of approximately 1200.

4. A ceramic insulator comprising a vitrified body having a dielectric composed of barium titanate and up to 45% titanium dioxide, said body having a dielectric constant of between 32 and 1200.

5. A ceramic insulator comprising a vitrified body having a dielectirc consisting of barium titanate.

HANS THURNAUER.
JAMES DEADERICK.

REFERENCES CITED

The following references are of record in the file of this patent:

UNITED STATES PATENTS

| Number | Name | Date |
|---|---|---|
| 2,165,819 | Alberts-Schonberg | July 11, 1939 |
| 2,218,655 | Peterson | Oct. 22, 1940 |
| 2,220,765 | Hirose et al. | Nov. 5, 1940 |
| 2,277,733 | Wainer et al. | Mar. 31, 1942 |
| 2,277,734 | Wainer et al. | Mar. 31, 1942 |
| 2,429,588 | Thurnauer et al. | Oct. 31, 1942 |

FOREIGN PATENTS

| Number | Country | Date |
|---|---|---|
| 719,067 | France | 1931 |